United States Patent [19]
Shepherd, Jr.

[11] 3,734,232
[45] May 22, 1973

[54] APPARATUS FOR SEISMIC WAVE DETECTION

[75] Inventor: Floyd Shepherd, Jr., Bartlesville, Okla.

[73] Assignee: Cities Service Oil Company, Tulsa, Okla.

[22] Filed: Sept. 10, 1970

[21] Appl. No.: 70,974

[52] U.S. Cl. ......... 181/.5 VM, 340/15.5 TS, 343/711
[51] Int. Cl. ........................... H01g 1/32, G01v 1/00
[58] Field of Search ................................. 181/.5 VM; 340/15.5 TS; 343/711

[56] References Cited

UNITED STATES PATENTS 3,327,287   6/1967   Ball et al. ......................... 181/.5 VM Primary Examiner—Benjamin A. Borchelt
Assistant Examiner—H. A. Birmiel
Attorney—J. Richard Geaman

[57] ABSTRACT

Noise in the continuous transmitting and recording of seismic signals produced by radio frequency and other transmitter interference appearing on the seismic amplifiers is reduced by removing the sending antenna from the recording vehicle, such that the antenna is placed a predetermined distance from the recording vehicle. This improvement upon the transmitting-receiving apparatus reduces the noise interference to an insignificant level and allows exact recordation of seismic data in continuous transmitting and receiving equipment.

5 Claims, 2 Drawing Figures

FLOYD SHEPHERD, JR.,
INVENTOR.

3,734,232

APPARATUS FOR SEISMIC WAVE DETECTION

BACKGROUND OF THE INVENTION

The present invention is an improved apparatus for seismic wave detection. More particularly, the apparatus of the present invention is an assembly by which the noise caused by the simultaneous transmitting and recording of seismic signals may be reduced to an insignificant level.

A continuing problem in the seismic industry is the noise produced by the continuous transmitting of radio signals in conjunction with the recordation of the resulting seismic signals. The apparent reason for this problem is that the radio frequency known as RF noise and other transmitter noise induced or caused by transmitting radio signals with simultaneous recordation of returned seismic signals is induced into the high gain seismic system causing noise to appear on the output of the seismic amplifiers. Numerous methods and apparatus taking the form of various configurations have been tried in the past to remove the RF noise and other background noises associated with simultaneous transmitting and recording. To date, many solutions have been tried such as shielding, bypass condensors, feed through condensors, working on ground loops and other methods and apparatus with none of the solutions appearing to be successful in removing the RF noise from the pickup signals recorded.

In the art of seismic prospecting with a reflection type system, a seismic disturbance is created at the earth's surface so as to be propagated through the various geologic layers of the earth, is reflected off these layers and by a diverse path returns to the surface where spaced detection stations or geophones upon the earth's surface detect it. A tremendous problem exists in that many reflective paths of interests are formed through multiple reflections causing what is known as a "ghost effect" between the actual geologic structures and their reflections and apparent geological structures which truly do not exist but are mere multiple reflections of reflected formations. These paths create a perturbing effect which is commonly designated interference or noise. Many of these undesirable paths exist, for example refraction, defraction, surface and scatter paths; whereas they must be removed from the seismic patterns detected such that the true formation reflections may be observed. Compounding this reflective interpolation process is the transmitter noise associated with a continuous transmission and recording of seismic reflected waves. Although by the compositing procedure of continuous transmission and recordation of seismic data, such that several different seismic disturbances are simultaneously initiated at spaced transmitting stations and the resultant seismic waves are detected by a plurality of detectors, with the detectors being located in the same positions during the creation of the seismic disturbance, the ghost effect may be partially removed and a more definite structural reflection pattern derived. However, in the composite procedure the inherent problem of transmission noise being picked up by the seismic detectors has not been readily solved. What is required is an apparatus and method for the removal of the radio frequency noise resulting from the simultaneous transmission and recordation of seismic data such that the resulting composite signal may be correlated with a transmitted signal to provide the exact travel times of the signal to the geological reflected layers determined so that exact seismic data and geologic mapping of subsurface structures may be obtained.

It is an object of the present invention to provide an improved apparatus for the continuous transmission and recordation of seismic data.

It is another object of the present invention to provide an improved apparatus for seismic wave detection such that radio frequency noise and other transmitter noise is reduced to an insignificant level.

It is still a further object of the present invention to derive a simplified transmission apparatus so that the radio frequency noise induced into the high gain seismic system causing noise to appear on the output of the seismic amplifiers is reduced to an insignificant level.

With these and other objects in mind the present invention will be more fully developed in the following description with the particular reference to the accompanying drawings.

SUMMARY OF THE INVENTION

The objects of the present invention are accomplished within an improved apparatus for the simultaneous transmission and recording of seismic waves. The apparatus for the simultaneous transmission and recording of seismic waves comprises a first vehicle having a transmitter contained upon the vehicle and a sending antenna electrically connected to the transmitter. A second vehicle is provided with a radio receiver with a receiving antenna electrically connected to the radio receiver and an electromotive converter and energy transmitter, which responds to the signal received by the radio receiver, as a part of the second vehicle. An amplifier-recorder is contained upon the first vehicle with geophones positioned on the earth's surface electrically connected to the amplifier-recorder. The improvement of the apparatus of the present invention comprises segregating the sending antenna from the first vehicle by positioning the sending antenna upon the earth's surface a distance from the first vehicle.

In the apparatus of the present invention, the sending antenna contains means for positioning the sending antenna, preferably in a vertical position. The means for positioning the sending antenna may comprise a series of legs, for example forming a tripod, attached to the base of the sending antenna. Also included in the apparatus of the present invention is a flexible electrical conduit which acts as the electrical connection between the sending antenna and the transmitter on the first vehicle.

BRIEF DESCRIPTION OF THE DRAWINGS

The present invention may be more fully understood with particular reference to the following drawings in which.

DETAILED DESCRIPTION OF THE INVENTION

In the improved apparatus of the present invention it has been discovered that removing the sending antenna from the recording vehicle and placing the antenna at some distance from the recording vehicle reduces the problem of radio frequency (RF) noise to an insignificant level. By this discovery it has been found that the noise problem which continuously plagued prior practitioners and which was compounded by the fact that the exact source of the noise was not determinable has been solved. It has been found that the RF noise from the output of the transmitting section of the seismic equipment may be reduced to a tolerable sensitivity level by removing the sending antenna from the vicinity of the recording system. By this removal the noise level is reduced as the distance between the amplifier-recorder and sending antenna is increased. In particular, it has been found that if the antenna is removed more than 18 inches and as necessary up to about 100 feet, the noise level from the transmitting apparatus is reduced to a level which may be tolerated.

Although the disclosure herein is predicated upon the use of oscillatory signal generating vibrators, it should be understood the apparatus and method of the present invention may be utilized with any simultaneous transmitting and recording apparatus.

Figure 1:
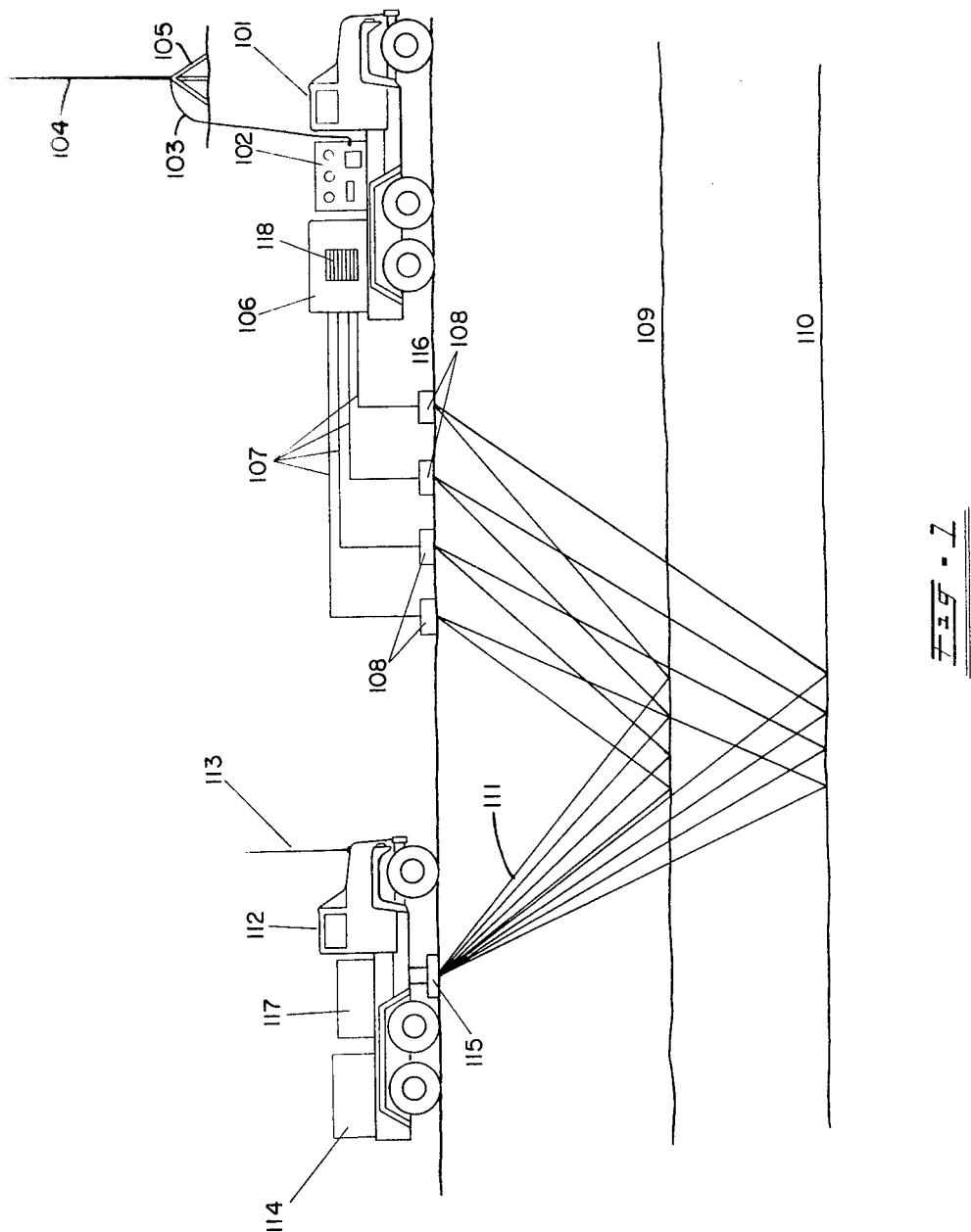
FIG. 1 represents diagrammatically the apparatus of the present invention for minimizing and eliminating the radio frequency noise associated with simultaneous transmission and recordation of seismic waves.

To more fully appreciate the apparatus and method of the present invention, FIG. 1 is presented which illustrates the improved apparatus of the present invention for the simultaneous transmission and recording of seismic waves. In FIG. 1, transmitting and recording vehicle 101 is positioned upon the earth's surface 116. The recording transmission vehicle 101 contains a transmitter 102 electrically connected by flexible electrical conduit 103 to transmitting antenna 104 having a tripod base 105 so as to be positioned vertically upon the earth's surface 116. A signal produced from transmitter 102 is conveyed through flexible electrical conduit 103 and transmitted by sending antenna 104 such that it is received by a second vehicle 112 through a receiving antenna 113. The radio signal transmitted by transmitter 102 is sensed by the radio receiver 113 such that the radio receiver 114 modulates and detects the radio wave and output of the receiver 114 and is amplified by an amplifier 117 which is utilized to drive an electrically controlled transducer in the form of a vibrator 115 through a phase shifting network so that the vibrator 115 generates the oscillatory signal 111 imparted to the earth's surface 116. The oscillatory signal 111 is reflected off geological structures 109 and 110, respectively, and reflected back to the earth's surface 116 where it is detected by transducers in the form of a geophones 108. One or more geophones 108 are positioned along the earth's surface 116 so that multiple recordings of seismic wave reflections of the oscillatory signals 111 are recorded from the geological structures 109 and 110. The seismic signals are recorded by geophones 108 and electrically transferred through electrical connections 107 to an amplifier-recorder system 106 which also produces the sweep signal and amplifies the geophone signals to record on a magnetic tape 118. The magnetic tape 118 then contains the seismic waves detected by the recording system such that a geophysical processing of the magnetic tape may be utilized to detect the geological formations 109 and 110 and their relative structural positions within the earth. The improvement of the present invention comprises the placing of the antenna 104 a predetermined distance from the transmitting-receiving vehicle 101 such that radio frequency noise and other noise resulting from the simultaneous transmission and recordation of the seismic waves is reduced to an insignificant level.

Figure 2:
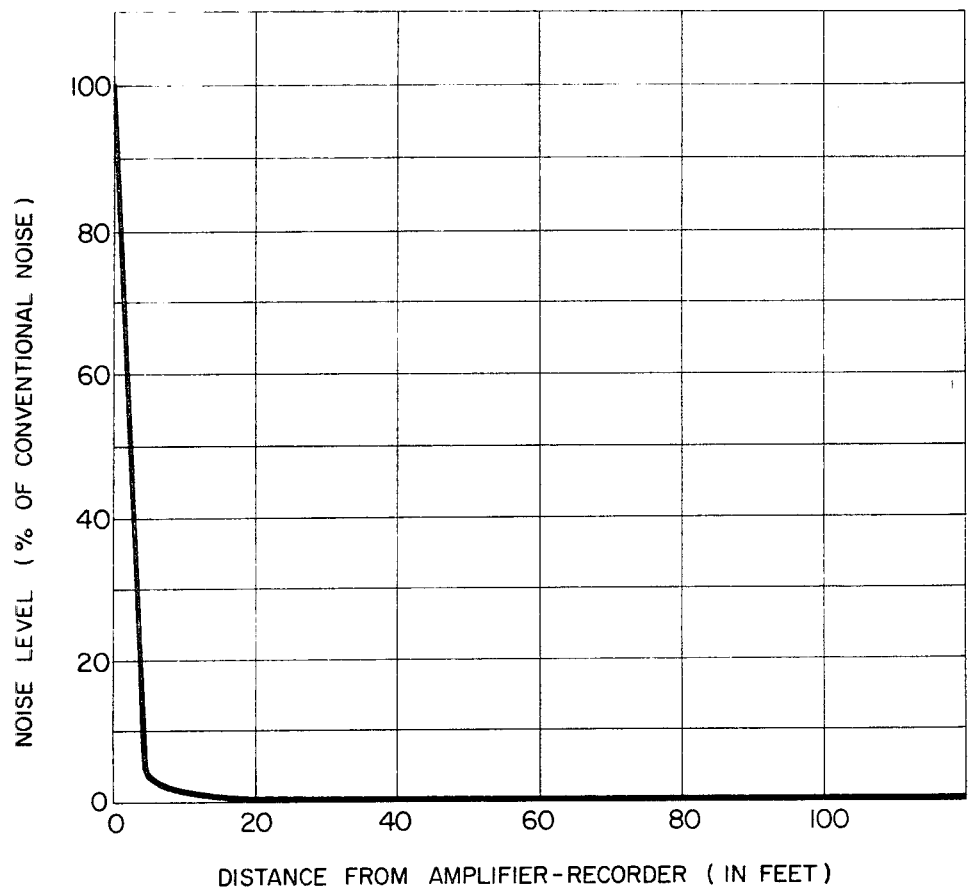
FIG. 2 represents the decrease in radio frequency noise recorded by the amplifier recorder on the first vehicle as a function of the distance at which the sending antenna is positioned from the recording vehicle.

The exact reduction in the radio frequency noise level by use of the apparatus of the present invention may be more easily depicted by referral to FIG. 2 in which the ratio of radio frequency noise picked up by the amplifier-recorder of the transmitting receiving vehicle is shown as a function of the distance the antenna is positioned from the receiving transmitting vehicle. It should be noted in FIG. 2 that at distances greater than 18 inches and especially at those distances greater than twenty feet the amount of radio frequency noise associated with the simultaneous transmitting and receiving of the apparatus of the present invention is reduced to a level which is tolerable and does not interfere with the seismic recording from the geophones. Therefore it is a preferred embodiment of the present invention that the sending antenna be positioned at a distance from the transmitting-receiving vehicle such that the radio frequency noise associated with the apparatus of the present invention is reduced to an insignificant level in comparison to the seismic data being received from the geophones. It has been found that positioning the sending antenna at distances up to about 100 feet from the transmitting-recording apparatus has been sufficient for all seismic studies conducted.

The improved positioning of the sending antenna requires that it have means for positioning the antenna since it may not be attached to the transmitting-receiving vehicle as was the original practice prior to the disclosure of the present invention. The means for positioning the antenna may include, for example a tripod type base attached to the antenna, a knife-like base on the antenna so that it may be driven into the ground and stand vertically or other mechanical means for so positioning the antenna. The antenna generally is connected by a flexible electrical conduit, for example a flexible electrical cord, of sufficient material makeup that it will withstand the adverse elements to which it may be subjected and the terrain over which it may be dragged.

Through the use of the apparatus of the present invention, it has been found that seismic data may be recorded in improved form by the simultaneous transmission and recordation of seismic waves using systems otherwise commonly utilized in seismic wave propagation and detection. It has been found that by placing the sending antenna a distance from the transmitting truck, attached to a length of conductor for a ground terminal and anchored securely to the ground, the problem of noise feedback from the transmitting section of the transmitting truck can be reduced for all usable decible outputs of the seismic equipment. Therefore, by use of the present apparatus one is capable of using a high gain recording system with a lower noise level, due to the absence of the RF noise, to enhance the wave forms produced from the earth to further determine the structural characteristics of the sector of the earth being studied.

The present invention has been described herein with respect to particular embodiments thereof. It will be appreciated by those skilled in the art, however, that various changes and modifications can be made without departing from the scope of the invention.

Therefore, I claim:

1. Improved apparatus for the simultaneous transmission and recording of seismic waves comprising:

a. a first vehicle;
b. a radio transmitter contained in the first vehicle;
c. a sending antenna electrically connected to the transmitter, said antenna being segregated from the first vehicle and positioned at a distance therefrom within the range of more than 18 inches to about 100 feet;
d. a second vehicle;
e. a radio receiver contained in the second vehicle;
f. a receiving antenna electrically connected to the radio receiver;
g. an electromotive converter and energy transmitter responsive to the signal received by the radio-receiver;
h. an amplifier-recorder contained in the first vehicle; and
i. one or more geophones positioned upon the earth's surface and electrically connected to the amplifier-recorder.

2. The apparatus of claim 1 in which the sending antenna contains means for positioning the sending antenna in a vertical position.

3. The apparatus of claim 2 in which the means for positioning the sending antenna in a vertical position is a series of legs forming a tripod attached to the base of the sending antenna.

4. The apparatus of claim 1 in which the sending antenna is electrically connected to the transmitter by a flexible electrical conduit.

5. The apparatus of claim 1 wherein a conductor extends from the first vehicle to the antenna and the antenna is anchored securely to the ground.

* * * * *